R. A. SMITH AND J. J. SERRELL.
FLEXIBLE COUPLING DEVICE.
APPLICATION FILED AUG. 20, 1919.
1,343,413.
Patented June 15, 1920.
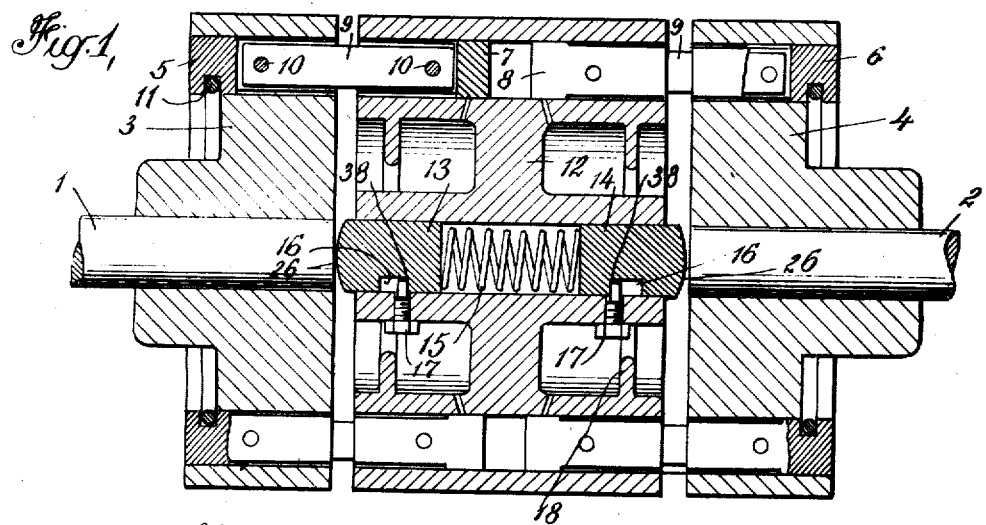
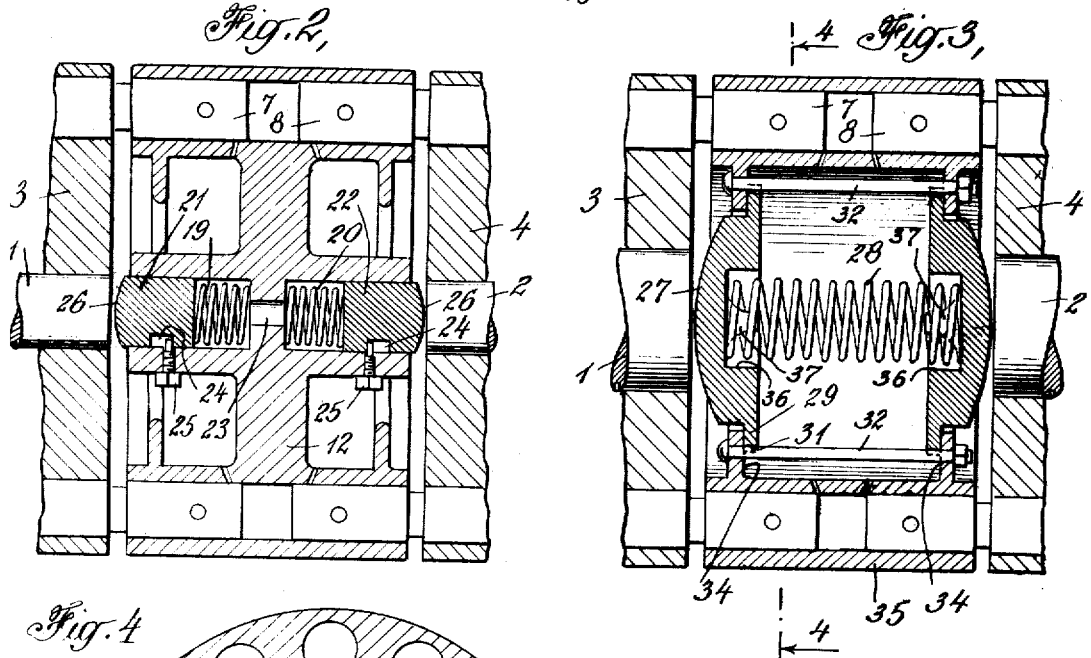
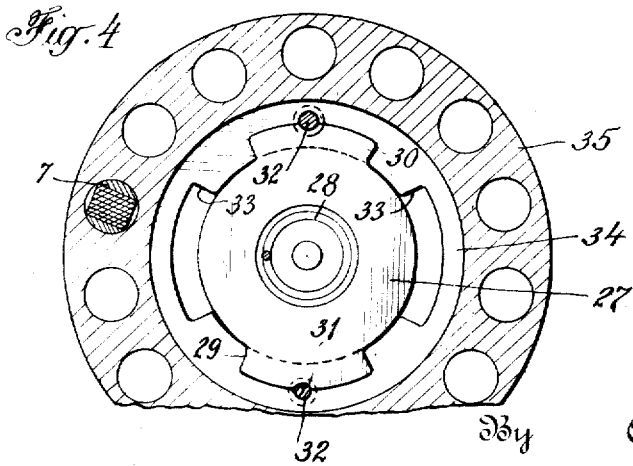

UNITED STATES PATENT OFFICE.

ROBERT A. SMITH, OF MAHWAH, AND JOHN J. SERRELL, OF ELIZABETH, NEW JERSEY, ASSIGNORS TO SMITH & SERRELL, OF MAHWAH, NEW JERSEY, A COPARTNERSHIP CONSISTING OF SAID SMITH AND SAID SERRELL.

FLEXIBLE COUPLING DEVICE.

1,343,413.  Specification of Letters Patent.  Patented June 15, 1920.

Application filed August 20, 1919. Serial No. 318,694.

*To all whom it may concern:*

Be it known that we, ROBERT A. SMITH, of Mahwah, Bergen county, State of New Jersey, and JOHN J. SERRELL, of Elizabeth, Union county, State of New Jersey, citizens of the United States, have made a new and useful Invention Relating to Flexible Coupling Devices, of which the following is a specification, taken in connection with the accompanying drawing, which forms part of the same.

This invention relates especially to compound flexible coupling devices in which flange coupling members are secured to shafts or other rotating elements and are connected together through an interposed floating ring coupling member by means of resilient coupling pins of any suitable construction. In order to maintain such coupling devices in efficient operation the floating ring should be maintained in substantially central position between the two outer or flange coupling members, and for this purpose spring actuated centering devices are provided to coöperate substantially axially with the shaft ends or other parts of the coupling so as to exert an automatic restoring action whenever the floating ring is axially displaced from its substantially central position. For this purpose substantially axially arranged centering or pusher shafts or members may be mounted within the floating ring or other coupling members and pressed outward by one or more suitable centering springs so that when the floating ring assumes a noncentral position the spring pressure of these pusher members is increased or rendered active so that they exert a resilient restoring or centering action on the floating ring until it resumes its substantially central normal position.

The accompanying drawing shows in a somewhat diagrammatic way illustrative embodiments of this invention, and Figure 1 is a longitudinal section through one form of coupling.

Figs. 2 and 3 are partial longitudinal sections showing modified constructions; and Fig. 4 is a transverse sectional view taken substantially along the line 4—4 of Fig. 3.

The outer or flange coupling members of any suitable construction, such as 3, 4, indicated in Fig. 1, may be connected to the shafts 1, 2 or the other rotary members employed and these coupling members and the interposed floating ring coupling member 12 may be formed with suitable coöperating bearing holes or recesses with which resilient coupling pins of any suitable construction may coöperate so as to yieldingly connect the different coupling members. As indicated in Fig. 1, the coupling pins may, for instance, comprise leaf springs 9 connected by the pins or rivets 10 with the bearing end 5 in the coupling member 3 and also with the bearing end 7 in the coöperating bearing hole in the floating ring. If desired, a retainer spring or device 11 may engage recesses in some or all of these bearing ends so as to maintain their longitudinal alinement in one of the members, a similar retaining device being employed in connection with the bearing end 6 yieldingly connected by similar springs with the metallic bearing ends 8 in the floating ring, although, of course, other forms of resilient coupling pins or devices may be employed to yieldingly connect these coöperating coupling members.

These coupling members are provided with centering devices including pusher or centering members preferably axially arranged in some of the members so as to exert an automatic restoring action if the floating ring becomes axially displaced from its normal or central position. These centering members may comprise the axial pusher shafts or members 13, 14 mounted in a suitable recess in the floating ring and preferably having rounded or reduced contact ends 26 so as to have substantially central contact with the coöperating coupling members. These pusher shafts are normally forced outward by one or more interposed springs, such as 15, and their outward movement is controlled by restraining devices, such as a stop bolt or pin 17 which normally engages the end 38 of the control recess 16 in each of the pusher shafts when the floating ring is substantially central. If, however, the floating ring works endwise to any appreciable extent one of the centering or pusher members comes into contact and thereupon exerts an unbalanced spring restoring pressure which tends to force the floating ring back to its normal central position, this restoring force ceasing when the centering member again comes into contact with its stop member 17. For most purposes it is desirable to have a slight clearance such as a few hundredths of an inch between each of these centering members and the cooperating surface of the adjacent coupling member, this clearance being, of course, considerably exaggerated in the drawing for the sake of clearness. If desired, however, these centering members may be normally in contact so as to exert a substantially balanced spring pressure when the floating ring is in its normal central position so that when the floating ring moves axially one of these spring pressures is reduced to zero, leaving an effective restoring component tending to rapidly restore the floating ring to its normal central or other position under operating conditions.

A modified arrangement is shown in Fig. 2 in which the two centering or pusher members 21, 22 are substantially axially located in the floating ring 12 and provided with similarly reduced or rounded ends 26 to engage the adjacent shafts or coupling members. In this instance a central web or abutment 23 is provided against which the restoring springs 19, 20 engage so as to exert a substantially equal outward pressure on the two centering members when the floating ring is in its normal central position. With such relatively short springs the spring action becomes rapidly less as the spring length increases due to the outward movement of the centering member 22, for instance, when the floating ring moves or works over to the left. Thus even where such stop pins or members as 25 are not provided in connection with the control recesses 24 these axially located spring actuated restoring members have an effective centering action on the floating ring and in this case also there is no such continued compression and expansion of the springs as would take place with peripheral or non-axial springs acting between two such coupling members which were slightly out of alinement, for example.

Fig. 3 shows another illustrative embodiment of the invention in which the floating ring 35 is provided with two radial webs 34 adjacent its outer faces which may as indicated in Fig. 4 be formed with inserting recesses 33. This makes it possible to readily assemble the pusher members 27 in the floating ring by bringing the restraining lugs 29 on these pusher members into line with the inserting recesses and then turning the parts into the normal holding position indicated in Figs. 3 and 4 in which holding or alining bolts 32 coöperating with the recesses 31 definitely hold the parts in this position while still allowing longitudinal movement of the centering members which may have curved or projecting central portions 27 to secure substantial axial contact with the adjacent coupling members. These centering members may be forced outward by a central spring 28 having its ends arranged around the pins or projections 37 in the recesses 36 so that these centering members are normally forced outward to such extent as is controlled by their restraining or stop lugs 29. Substantial axial movement of the floating ring brings into action the spring restoring pressure or unbalanced force of one of these centering members 27 so that the floating ring is rapidly worked back to a substantially central position in which the outward pressure of these centering members may be balanced or reduced to zero by giving the parts suitable slight clearance which is somewhat exaggerated in the drawing.

This invention has been described in connection with a number of illustrative embodiments, forms, proportions, parts, shapes, materials, arrangements and methods of manufacture and use, to the details of which disclosure the invention is not of course to be limited, since what is claimed as new and what is desired to be secured by Letters Patent is set forth in the appended claims:

1. In flexible couplings, outer coupling members and an interposed floating ring formed with coupling bearing holes, resilient coupling pins slidably mounted in said holes to yieldingly connect said coupling members, said floating ring being formed with substantially axial recesses, centering shaft members in said recesses and normally spring pressed outward, a restraining stop member coöperating with a control recess formed in each of said centering members so that when said floating ring is displaced from its normal central position said centering members exert a spring restoring action thereon.

2. In flexible couplings, outer coupling members and an interposed floating ring, resilient coupling pins to yieldably connect said coupling members, said floating ring being formed with substantially axial recesses, centering members in said recesses and normally spring pressed outward, a restraining stop member coöperating with each of said centering members so that when said floating ring is displaced from its normal central position said centering members exert a spring restoring action theron.

3. In flexible couplings, outer coupling members and an interposed floating coupling member, resilient coupling devices to yieldably connect said coupling members, substantially axial centering members mounted in said interposed coupling member and normally spring pressed outward and restraining devices coöperating with said centering members so that when said interposed coupling member is displaced from its normal central position said centering members exert a spring restoring action thereon.

4. In flexible couplings, outer coupling members and an interposed floating coupling member, resilient coupling devices to yieldably connect said coupling members, substantially axial centering members mounted in said interposed coupling member and normally spring pressed outward so that when said interposed coupling member is displaced from its normal central position said centering members exert a spring restoring action thereon.

5. In couplings, outer coupling members and an interposed coupling member, coupling devices to yieldably connect said coupling members, spring actuated centering members mounted in said coupling members away from the periphery thereof and normally resiliently forced toward the coöperating coupling members, and coöperating restraining means limiting the movement of said centering members and exerting a spring restoring action on said interposed coupling member when it moves substantially from its predetermined intermediate position between said outer coupling members.

6. In couplings, outer coupling members and an interposed coupling member, coupling devices to connect said coupling members, centering members mounted in said coupling members away from the periphery thereof and normally resiliently forced toward the coöperating coupling members, and coöperating means limiting the movement of said centering members and exerting restoring action on said interposed coupling member when it moves substantially from its predetermined intermediate position between said outer coupling members.

7. In couplings, outer coupling members and an interposed coupling member, coupling devices to connect said coupling members, centering members mounted in said coupling members away from the periphery thereof and exerting restoring action on said interposed coupling member when it moves substantially axially from its predetermined intermediate position between said outer coupling members.

ROBERT A. SMITH,
JOHN J. SERRELL.